United States Patent [19]

Roth

[11] 3,719,772

[45] March 6, 1973

[54] COLOR TELEVISION MATRIXING CIRCUIT

[75] Inventor: Stephen A. Roth, Beaverton, Oreg.

[73] Assignee: Tektronex, Inc., Beaverton, Oreg.

[22] Filed: March 22, 1971

[21] Appl. No.: 126,701

[52] U.S. Cl. ..............................178/5.4 MA, 330/124

[51] Int. Cl. ..............................H04n 9/52

[58] Field of Search ........178/5.4 R, 5.4 MA, 5.4 SD; 328/156; 330/124, 147, 148, 69, 30 R

[56] References Cited

UNITED STATES PATENTS

| | | | |
|---|---|---|---|
| 2,763,716 | 9/1956 | Farr | 178/5.4 R |
| R24,747 | 12/1959 | Adler et al. | 178/5.4 S |
| 2,974,289 | 3/1961 | Cockburn | 330/124 R |
| 3,519,735 | 7/1970 | Chua et al. | 178/5.4 R |

*Primary Examiner*—Robert L. Richardson
*Attorney*—Buckhorn, Blore, Klarquist & Sparkman

[57] ABSTRACT

A circuit employing three operational amplifiers provides three color difference signals in proper phase relation without requiring auxiliary delay means. The (R-Y) and (B-Y) outputs are supplied by noninverting operational amplifiers having high impedance inputs connected to the outputs of (R-Y) and (B-Y) low-pass filters. The filters are provided with terminating resistors which also form summing input resistors for a third, inverting, operational amplifier, the inverting input terminal of which is a virtual ground. The output of this third amplifier is the (G-Y) color difference signal.

10 Claims, 1 Drawing Figure

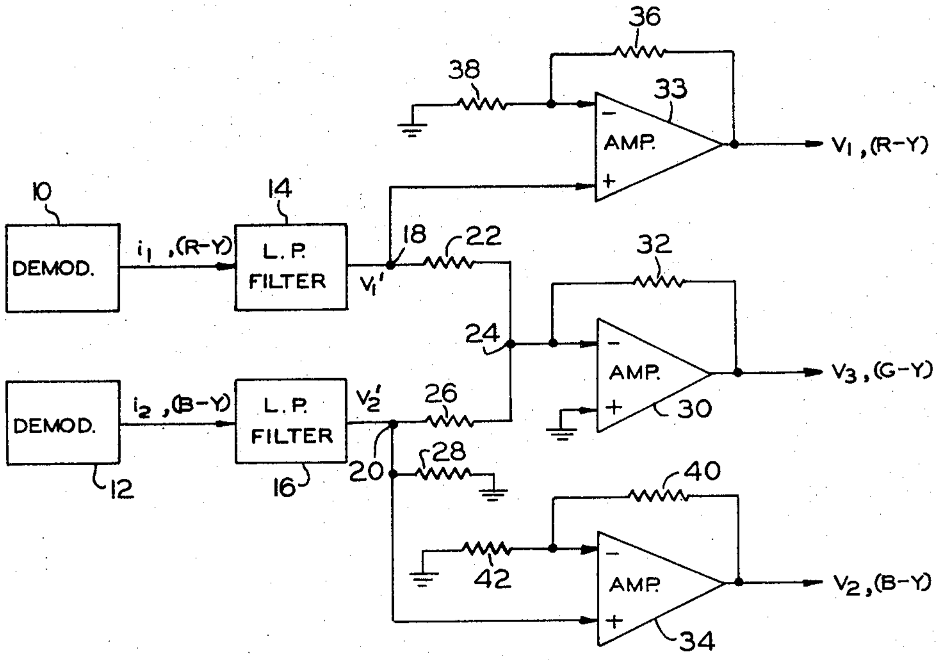
STEPHEN A. ROTH
*INVENTOR*
*BY*
*BUCKHORN, BLORE, KLARQUIST & SPARKMAN*
*ATTORNEYS*

COLOR TELEVISION MATRIXING CIRCUIT

BACKGROUND OF THE INVENTION

In accordance with color television receiver practice, a pair of color difference signals can be detected in a pair of demodulators, and a third color difference signal can be generated from the first pair. Thus, the (G-Y) color difference signal may be derived as a negative sum of the (R-Y) and (B-Y) signals, added in correct proportions. A common practice is to follow amplifiers which amplify the (R-Y) and (B-Y) demodulator outputs with a further inverting amplifier supplying a negative sum proportional to (G-Y). However, the additional delay produced in the (G-Y) channel may require further delay means in the (R-Y) and (B-Y) channels if the three color difference signals are to have the accurately intended phase relation. Not only does the additional delay require additional components, but also delay may change with temperature, change of component values, etc. Another possible solution has been the employment of three separate demodulators, one for each color difference signal. This, of course, requires a further expenditure of equipment, and may not insure the maintenance of a correct phase relation between the different signals.

SUMMARY OF THE INVENTION

According to the present invention, three amplifiers are provided which receive the outputs from (R-Y) and (B-Y) channel filters, while a terminating resistor is provided for each filter. The terminating resistors also comprise summing input resistors for one of the amplifiers comprising an inverting operational amplifier. This amplifier supplies the desired (G-Y) output. The junction of the aforementioned two resistors, at the inverting input of the amplifier, constitutes a virtual ground point whereby the resistors are properly connected for terminating the respective filters. The remaining two amplifiers, for supplying the (R-Y) and (B-Y) outputs, are characterized by high input impedance and are coupled to the ends of the aforementioned filter terminating resistors remote from their common connection. The remaining two amplifiers are desirably non-inverting operational amplifiers. The outputs of the circuit are the three color difference signals in proper phase relation to one another.

In accordance with a specific embodiment of the present invention, one of the filter terminating resistors is shunted by a grounded resistor, in part providing the roper filter termination while at the same time permitting diversion of a selected proportion of filter current, such that the correct ratio of input currents for the first mentioned amplifier is selected for the generation of the (G-Y) output.

Accordingly, it is an object of the present invention to provide an improved color matrixing circuit for providing color television difference signals having a proper phase relation.

It is a further object of the present invention to provide an improved color television matrixing circuit which provides color television difference signals without the need of supplementary delay means and with need for no more than two color difference signal demodulators.

It is another object of the present invention to provide improved circuit for supplying three voltage output signals, one of which is inverted but of predetermined phase relation with respect to the other two, said output signals being supplied in response to a pair of filtered current input signals of a given polarity.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

The single FIGURE of the drawing is a schematic diagram of a circuit according to the present invention.

DETAILED DESCRIPTION

Referring to the single FIGURE of drawings, a circuit for deriving color TV color difference signals in substantially simultaneous time phase is illustrated. In general, the outputs desired are voltages $V_1$, $V_2$, and $V_3$, respectively proportional to the (R-Y) color difference signal, (B-Y) color difference signal, and the (G-Y) color difference signal.

The currents $i_1$ and $i_2$ are provided by color demodulators 10 and 12 in conventional television receiving type circuitry and provide, through low-pass filters 14 and 16 respectively, the (R-Y) and (B-Y) color difference signal components. The low-pass filters restrict the currents to the desired color difference signal ranges. The (R-Y) and (B-Y) quadrature signals from the synchronous demodulators are bandwidth limited by filters 14 and 16 in a conventional manner to remove undesirable components.

According to the present circuit, the output of low-pass filter 14 is received at terminal 18, and the output of low-pass filter 16 is received at terminal 20. Proper terminating resistance must be provided at these points in order that the low-pass filters may operate correctly. A first terminating resistance 22 is disposed between terminal 18 and a common terminal 24, while a second terminating resistance 26 is disposed between the aforementioned terminal 20 and common terminal 24. The resistance of resistor 22 is the correct value for terminating filter 14. The resistance of resistor 26 may or may not be the proper value for terminating filter 16, as will be more fully described. Thus, an additional resistor 28 may be disposed between terminal 20 and ground, whereby the parallel combination of resistors 26 and 28 provides the proper termination for filter 16. Assuming filters 14 and 16 require the same terminating resistance, then resistor 26, if used alone, will have the same resistance value as resistor 22, and will by itself provide the proper termination for filter 16. If resistor 28 is also used, then the resistance of resistors 26 and 28 in parallel will equal the resistance of resistor 22.

Resistors 22 and 26 further comprise input resistors for an operational amplifier also including high gain differential amplifier 30. Amplifier 30 has inverting and noninverting inputs respectively designated by a minus sign and a plus sign. The negative or inverting input is connected to common terminal 24, while the positive or noninverting input is returned to a point of common reference potential or ground. A feedback resistor 32 is interposed between the output of amplifier 30 and common terminal 24. The circuit including amplifier 30 as thus connected comprises an inverting operational amplifier wherein the common terminal 24 is forced to a virtual ground by action of the feedback current through the resistor 32. Also, common terminal 24 comprises a summing point for the current in resistors 22 and 26. The output voltage, $V_3$, substantially equals $(i_1 + i_2)R_{32}$, where the currents $i_1$ and $i_2$ are the input currents passing through filters 14 and 16 respectively, and $R_{32}$ is the resistance of feedback resistor 32. As hereinbefore mentioned, the output $V_3$ comprises the (G-Y) color difference signal output.

Since the operational amplifier forces common terminal 24 to a virtual ground level, the common terminal 24 acts as a ground point for termination of resistors 22 and 26. Also since the summing junction comprising terminal 24 is a virtual ground, two voltage signals $V_1'$ and $V_2'$ are developed across resistors 22 and 26, respectively, wherein $V_1' = i_1R_{22}$, and $V_2' = i_2R_{26}$, with the terms being the resistances of the resistors indicated by the subscripts. It will be observed that these voltage signals, $V_1'$ and $V_2'$, are in exact time coincidence and phase with the current signals applied to amplifier 30. The voltages $V_1'$ and $V_2'$ are applied to noninverting operational amplifiers, respectively including a high gain amplifier 33 and a high gain amplifier 34. As thus appears, in phase signals are derived from both ends of the filter terminating resistors. Amplifier 33 is provided with a feedback resistor 36 disposed between the output of the amplifier and the inverting input thereof. An input resistor 38 is located between the inverting input of amplifier 33 and a point of common reference potential or ground.

The noninverting input of amplifier 33, indicated by the plus sign, is coupled directly to terminal 18. As will be understood by those skilled in the art, the non-inverting input terminal of amplifier 33 represents a high impedance point, such as may comprise the base of a transistor or the like, and is not returned to a reference level through external circuitry such as is the case with the inverting input. Therefore, connection of the noninverting input to terminal 18 will have substantially no loading effect on the output of filter 14. The output, $V_1$, of amplifier 33 comprises the (R-Y) color difference signal output, and is substantially in phase with the corresponding current provided through resistor 22 to amplifier 30. Amplifiers 33 and 30 are desirably identical, whereby the delays therein will be identical providing outputs $V_1$ and $V_3$ that are in proper time relation with one another not requiring compensating delay elements. As hereinafter more fully described, resistance values employed are adjusted whereby the proper proportions of the (R-Y) and (B-Y) inputs are employed in generating $V_3$ or the (G-Y) output.

Terminal 20 is connected to the input of the noninverting operational amplifier including high gain amplifier 34. Terminal 20 is connected to the noninverting input of amplifier 34, with amplifier 34 desirably being substantially identical to amplifiers 30 and 33 as described above. A feedback resistor 40 is disposed between the output of amplifier 34 and the inverting input thereof while an input resistor 42 is interposed between the inverting input of amplifier 34 and a point of common reference potential or ground. Again, since the noninverting input of amplifier 34 represents a high impedance point, substantially no loading is produced at terminal 20 for filter 16. The output $V_2$ of amplifier 34 comprises (B-Y) output of the circuit provided in correct time relation with outputs $V_1$ and $V_3$ without requiring further delays.

The operational amplifiers producing the (R-Y) and (B-Y) outputs, $V_1$ and $V_2$, function according to the following relations: $V_1 = V_1'(1 + R_{36}/R_{38})$, and $V_2 = V_2'(1 + R_{40}/R_{42})$. The resistance values $R$ indicate the resistance of the resistor referred to by the particular subscript. Feedback resistors 36, 32 and 40 can be made equal in value, which will tend to equalize the output impedances of amplifiers 33, 30 and 34. As hereinbefore mentioned, termination resistor 22 is designed to provide the correct output load for filter 14. Resistor 26 may have a value for providing the correct load impedance for filter 16, in which case resistor 28 will not be used. However, as will be understood by those skilled in the art, output $V_3$ of amplifier 30 must be the properly proportioned, summed combination of the $(R-Y)$ and $(B-Y)$ input signals. Also the sum of inputs needs to be inverted. Thus, in general, $(G-Y) = -K(R-Y) - M(B-Y)$. In a particular instance $K$ may equal 0.57966 and M may equal 0.378324. In order to attain the proper output, $V_3$, the inputs $i_1$ and $i_2$ could, for instance, themselves bear the ratio of $K/M$. However, in a general case, $i_1$ and $i_2$ would be equal or have some relation other than the desired ratio. In such instance, the combination of resistors 26 and 28 can be employed for providing the desired output impedance for filter 16 while at the same time supplying the correct proportion of current $i_2$ to summing terminal 24 for maintaining the correct ratio. Also, of course, the correct voltage, $V_2'$, will thereby be developed across resistor 26, and will be in phase with the current through the resistor.

Since the output signals, $V_1$, $V_2$ and $V_3$, desirably have a predetermined amplitude relation with respect to one another when used in further matrixing with the Y luminance signal, the amplitudes of outputs $V_1$ and $V_2$ may be further adjusted relative to the output of $V_3$. In accordance with the above expressions for the values of $V_1$ and $V_2$, it is seen that these values can be adjusted through selection of the resistance of resistors 38 and 42 respectively without making other changes in the circuit. Alternatively, it may be desired that the outputs $V_1$, $V_2$ and $V_3$ be substantially equal in amplitude, with further relative attenuation therebetween being achieved by output circuitry not shown. If desired, the amplitude of the $V_3$ output may be adjusted through change in the value of resistor 32.

As thus appears, three substantially time coincident or correctly phased color television difference signals are secured by the circuit according to the present invention. No additional delay means or delay amplifiers are required for the (R-Y) and (B-Y) channels. Also two demodulators with two filters are used. As will also be appreciated, the amplifiers herein employed will have substantially identical delays, phase shifts, response to temperature and the like, and therefore the outputs remain in the proper phase and proportion.

Correct phase relation within a few nanoseconds can be achieved and maintained, and this accuracy is particularly desirable in color television testing instruments and the like. At the same time, the proper inversion and the correct proportion of inputs is achieved for the generation of the (G-Y) color difference signal.

While I have shown and described a preferred embodiment of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. A circuit for providing three voltage output signals, one of which is inverted and of predetermined phase relation with respect to the other two, in response to a pair of current input signals of a given polarity provided via a pair of filters, said circuit comprising:
- a pair of terminating resistors for said filters, said terminating resistors being returned to a common point,
- inverting amplification means having an input coupled to said common point and also having a feedback resistor for establishing said common point at a reference level, and completing, with said terminating resistors, an inverting operational amplifier,
- a second, noninverting,operational amplifier having a high impedance input terminal coupled to the filter connected end of one of the said resistors,
- and a third, noninverting,operational amplifier having a high impedance input terminal coupled to the filter connected end of said second resistor.

2. The circuit according to claim 1 further including an additional resistor connected to the filter connected end of one of said resistors, the remaining terminal of said additional resistor being returned to a point of common reference potential, said additional resistor in combination with said one of said resistors providing a predetermined value of impedance for terminating the filter connected thereto, while said one of said resistors supplies a proportion of the current from the last mentioned filter to said common point.

3. Apparatus for providing three color television difference signals in predetermined phase relation in response to first and second color demodulator color difference signal outputs, said apparatus comprising:
- first and second low-pass filters for receiving first and second color demodulator outputs,
- a first terminating resistor for the first filter having a first terminal connected to the output of said first filter,
- a second terminating resistor for the second filter having a first terminal connected to the output of the second filter,
- said first and second resistors having their remaining terminals connected to a common point for forming input resistors for an inverting operational amplifier,
- said inverting operational amplifier further comprising high gain amplifier means having an inverting input connected to said common point and a feedback resistor interposed between the output of such amplifier means and said common point, the output of said operational amplifier producing a color difference signal,
- a second, noninverting,amplifier having a high impedance input coupled to the first terminal of the first resistor,
- and a third, noninverting,amplifier having a high impedance input coupled to the first terminal of the second resistor, wherein said second and third amplifiers provide the remaining color difference output signals.

4. The apparatus according to claim 3 wherein said second and third amplifiers comprise noninverting operational amplifiers having noninverting input terminals connected respectively to the first terminals of said resistors, and also having inverting input terminals, each of said second and third amplifiers being further provided with a feedback resistor between an output thereof and said inverting input terminal, as well as an input resistor interposed between said inverting input terminal and a point of reference potential.

5. The apparatus according to claim 3 further including an additional resistor having a first terminal thereof connected to the first terminal of said second resistor with the remaining terminal of said additional resistor being returned to a point of common reference potential, said additional resistor in parallel with said second resistor providing the proper output termination for the second filter while said second resistor provides the proper proportion of current from said second filter to said common point for generating the first mentioned color difference signal.

6. A circuit for providing a pair of output signals comprising:
- an input terminal,
- an operational amplifier comprising amplification means and an input resistor disposed between said input terminal and an inverting input of said amplification means, said operational amplifier further including a feedback resistance between the inverted output of said amplifier means and said input terminal, said operational amplifier providing a first output signal,
- and second noninverting operational amplifier means having a high impedance input coupled to said input terminal and providing a second output signal.

7. The circuit according to claim 6 further including a second input terminal and a second input resistor interposed between said second input terminal and said inverting input of said amplification means to provide current summing at such inverting input.

8. The circuit according to claim 7 further including an additional resistor coupling said second input terminal to a point of common reference potential for diverting a proportion of current from said second input terminal while providing a predetermined impedance at said second input terminal.

9. The circuit according to claim 8 wherein the parallel resistance of said second input resistor and said additional resistor is equal to the resistance of the first resistor.

10. The circuit according to claim 8 further including a filter connected to said second input terminal, said parallel resistance providing the output termination of said filter.

* * * * *